United States Patent
Parikh et al.

(10) Patent No.: US 10,079,807 B2
(45) Date of Patent: Sep. 18, 2018

(54) ANONYMOUS MESSAGING IN AN INSTANT MESSAGE GROUP CONVERSATION

(71) Applicant: CA, Inc., NewYork, NY (US)

(72) Inventors: Ravish Mukesh Parikh, Hicksville, NY (US); Richa P. Navani, Hicksville, NY (US)

(73) Assignee: CA, Inc., New York, NY (US)

( * ) Notice: Subject to any disclaimer, the term of this patent is extended or adjusted under 35 U.S.C. 154(b) by 305 days.

(21) Appl. No.: 15/019,034

(22) Filed: Feb. 9, 2016

(65) Prior Publication Data
US 2017/0230313 A1 Aug. 10, 2017

(51) Int. Cl.
H04L 29/06 (2006.01)
H04L 12/58 (2006.01)
H04L 29/08 (2006.01)
H04L 12/18 (2006.01)
G06Q 20/38 (2012.01)

(52) U.S. Cl.
CPC ....... *H04L 63/0421* (2013.01); *G06Q 20/383* (2013.01); *H04L 12/1822* (2013.01); *H04L 29/06632* (2013.01); *H04L 51/04* (2013.01); *H04L 51/38* (2013.01); *H04L 63/0407* (2013.01); *H04L 67/306* (2013.01)

(58) Field of Classification Search
CPC ......... H04L 29/06632; H04L 29/06639; H04L 29/06653; H04L 29/06646; H04L 63/0421; H04L 63/0407; H04L 51/00; H04L 51/04; H04L 51/38; H04L 12/1822; G06Q 20/383
See application file for complete search history.

(56) References Cited

U.S. PATENT DOCUMENTS

| 6,209,100 B1 * | 3/2001 | Robertson ............ G06Q 20/383 705/74 |
| 6,853,634 B1 * | 2/2005 | Davies .................... H04L 51/04 370/349 |
| 7,512,788 B2 * | 3/2009 | Choi .................. H04L 63/0421 713/163 |

(Continued)

FOREIGN PATENT DOCUMENTS

CN 105681154 A * 6/2016

OTHER PUBLICATIONS

Song et al., "Faceless: decentralized anonymous group messaging for online social networks." , Apr. 2012, ACM, Proceedings of the Fifth Workshop on Social Network Systems.*

(Continued)

*Primary Examiner* — Ramy M Osman
(74) *Attorney, Agent, or Firm* — Gilliam IP PLLC

(57) ABSTRACT

A message is created, by a first device associated with a first attendee, for an instant message group conversation among a plurality of attendees that includes the first attendee. At least one non-anonymous attendee and at least one anonymous attendee of the plurality of attendees are identified. The message is transmitted, by the first device to devices associated with others of the plurality of attendees. A response is received, by the first device as part of the instant message group conversation, to the message from a second device associated with the at least one anonymous attendee who is not identified, to at least one attendee of the plurality of attendees, as an author of the response.

7 Claims, 6 Drawing Sheets

(56) References Cited

U.S. PATENT DOCUMENTS

| | | | | |
|---|---|---|---|---|
| 7,765,257 | B2* | 7/2010 | Chen | H04L 67/306 370/260 |
| 9,378,488 | B1* | 6/2016 | Saraya | H04L 29/06 |
| 9,544,271 | B2* | 1/2017 | McFarland | H04L 63/0421 |
| 2001/0011351 | A1* | 8/2001 | Sako | G06Q 20/383 713/180 |
| 2003/0084103 | A1* | 5/2003 | Weiner | H04L 12/1822 709/205 |
| 2004/0019701 | A1* | 1/2004 | McGee | H04L 51/04 709/250 |
| 2004/0111612 | A1* | 6/2004 | Choi | H04L 63/0421 713/163 |
| 2005/0246419 | A1* | 11/2005 | Jaatinen | H04L 63/0421 709/204 |
| 2007/0067405 | A1* | 3/2007 | Eliovson | G06Q 10/10 709/206 |
| 2008/0010352 | A1* | 1/2008 | Donoho | G06Q 30/02 709/206 |
| 2008/0034040 | A1* | 2/2008 | Wherry | G06Q 10/107 709/204 |
| 2011/0138302 | A1* | 6/2011 | Schleifer | G06Q 10/10 715/753 |
| 2012/0236103 | A1* | 9/2012 | Cahill | H04L 51/32 348/14.01 |
| 2013/0073845 | A1* | 3/2013 | Teranishi | H04L 9/3255 713/156 |
| 2014/0162698 | A1* | 6/2014 | Han | H04W 4/023 455/456.3 |
| 2015/0156144 | A1* | 6/2015 | Srivathsa | H04L 63/0421 709/206 |
| 2015/0295964 | A1* | 10/2015 | Probolsky | H04L 67/10 709/204 |
| 2016/0127282 | A1* | 5/2016 | Nezarati | H04L 12/1822 715/758 |
| 2016/0294836 | A1* | 10/2016 | Williams | H04L 63/0421 |
| 2016/0344818 | A1* | 11/2016 | Bhayani | H04L 67/306 |
| 2017/0041263 | A1* | 2/2017 | Shekel | H04L 51/04 |
| 2017/0230313 | A1* | 8/2017 | Parikh | H04L 51/04 |

OTHER PUBLICATIONS

Lomas, Natasha, "Rumr, Group Messaging With an Anonymous Twist, Launches on iOS and Android", Mar. 25, 2014, techcrunch.com.*

Kent, "How to create a chat room for anonymous users online [Tip]" Jun. 1, 2015, https://dottech.org/.*

Wagner, Kurt, "Facebook Unveils Its Own Anonymous App", Oct. 23, 2014, www.recode.net.*

Zhang, Xin, "Is that possible to nest a slack channel inside another slack channel?", Feb. 24, 2016, stackoverflow.com.*

Alvarez, Cindy, "Allow us to create subgroups", Aug. 10, 2016, yammer.uservoice.com.*

Lumi Technologies Ltd, "Real-time polling and messaging app—Meetoo", http://meetoo.io/ as visited on Feb. 8, 2016., Apr. 6, 2015.

* cited by examiner

ANONYMOUS MESSAGING IN AN INSTANT MESSAGE GROUP CONVERSATION

BACKGROUND

The disclosure generally relates to the field of communications, and more particularly to instant message communications.

Instant message communications provide for real-time transmission of communication over a network (e.g., the Internet) between two or more users. The communications are typically text but can be video, audio or other types of multimedia.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to a mobile device used for instant messaging communications in illustrative examples. But aspects of this disclosure can be applied to any type of device (e.g., desktop computer, laptop computers, tablet computers, etc.) capable of network communications. In other instances, well-known instruction instances, protocols, structures and techniques have not been shown in detail in order not to obfuscate the description.

Overview

Various embodiments relate to instant message group conversations that include a group of three or more users (attendees). The group of attendees can include a combination of anonymous and non-anonymous attendees. For example, as part of creating the instant message group communication, the attendee that originates this group communication can determine who the other attendees are and whether these other attendees are anonymous or non-anonymous. After this originator attendee transmits the initial message for the instant message group communication, any response by an anonymous attendee may not include an identification of the author of the response. Instead, an author of a response from an anonymous attendee can be presented as someone within a group of attendees (e.g., "other attendees"). Also, as part of receiving a message, an anonymous attendee can be notified that they are anonymous. Such embodiments described herein that include anonymous attendees in an instant message group conversation can allow for quicker and more candid responses.

Example Operating Environment

Figure 1:
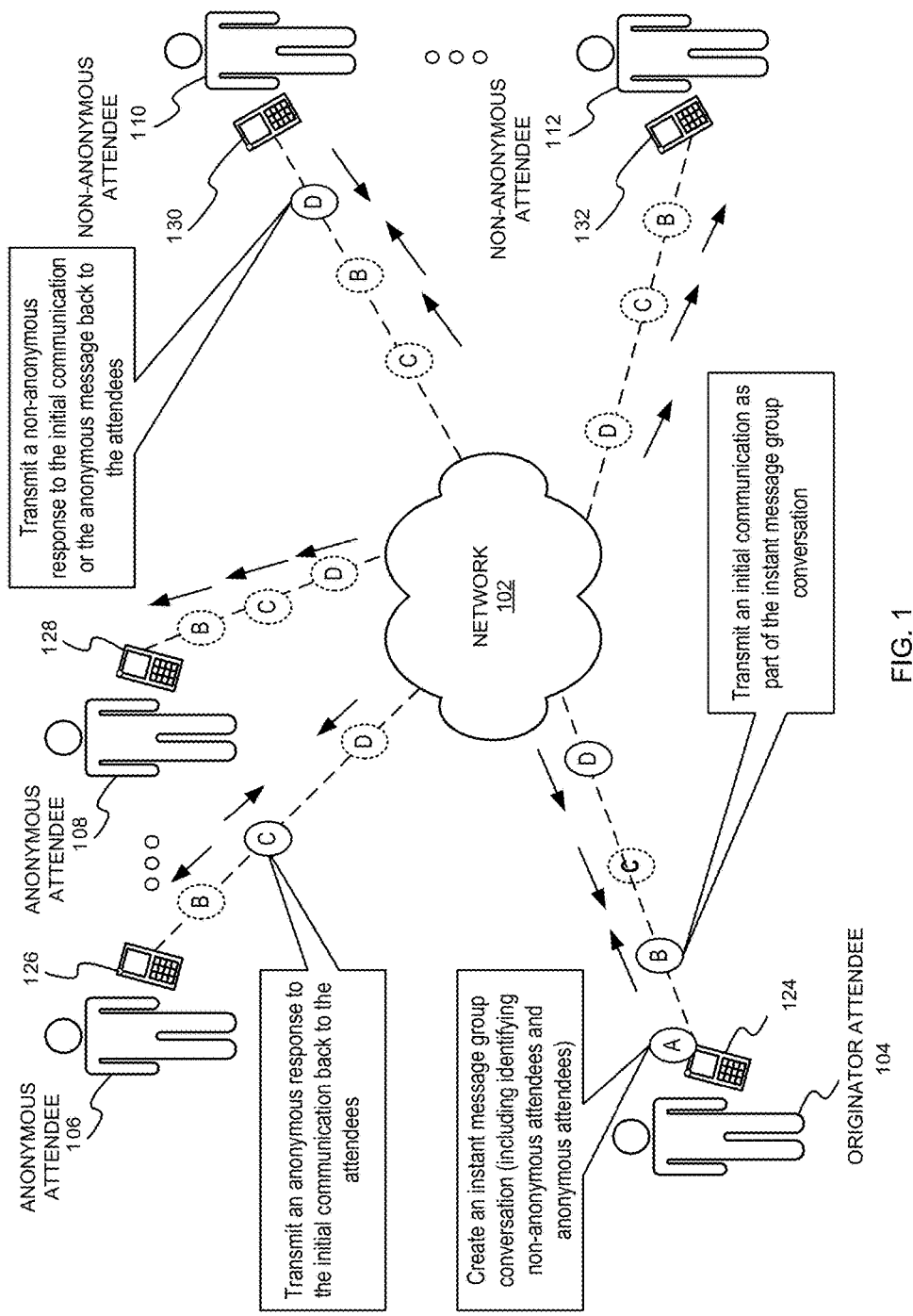
FIG. 1 depicts an example operating environment that include anonymous messaging as part of an instant message group conversation, according to some embodiments.

FIG. 1 depicts an example operating environment that include anonymous messaging as part of an instant message group conversation, according to some embodiments. FIG. 1 depicts a number of attendees. In the example of FIG. 1, the number of attendees include an originator attendee 104, a number of anonymous attendees (anonymous attendees 106-108), and a number of non-anonymous attendees (non-anonymous attendees 110-112).

Each attendee is associated with a communication device for instant message group communications with devices associated with other attendees. While depicted as a mobile device, the communication devices can be any type of device that provides network communications to allow for instant message communications with other devices. For example, the attendees can use a desktop computer, notebook computer, tablet computer, etc. The originator attendee 104 is associated with a communication device 124. The anonymous attendee 106 is associated with a communication device 126. The anonymous attendee 108 is associated with a communication device 128. The non-anonymous attendee 110 is associated with a communication device 130. The anonymous attendee 112 is associated with a communication device 132. The communication devices 124-132 are communicatively coupled to each other through a network 102.

To further illustrate, FIG. 1 is annotated with a series of letters A-D. These letters represent operational stages or communications. Although these stages are ordered for this example, the stages illustrate one example to aid in understanding this disclosure and should not be used to limit the claims. Subject matter falling within the scope of the claims can vary with respect to the order and some of the operations. For example, stages C and D can be executed at least partially in parallel with each other.

Figure 2:
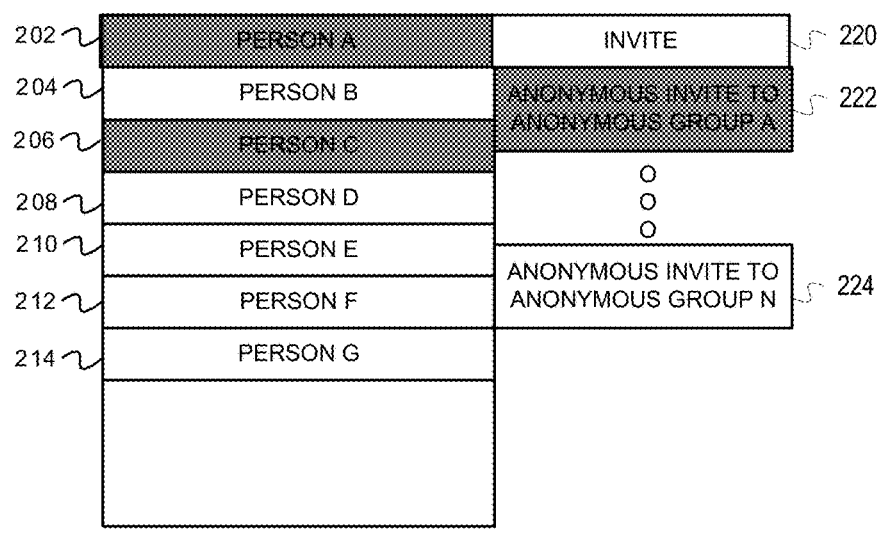
FIG. 2 depicts an example interface to allow an originator attendee to select other attendees to be part of an instant message group conversation, according to some embodiments.

At stage A, the communication device 124 creates an instant message group conversation. For example, the originator attendee 104 can provide input to create the instant message group conversation. The input can include selection of the other attendees that are to be part of the instant message group conversation along initial message. The initial message can include text, video, audio, etc. For example, the originator attendee 104 can open an instant message application on the communication device 124. The instant message application can provide an interface for selecting the other attendees. An example interface for selecting the other attendees is depicted in FIG. 2, which is further described below.

As part of the selection of the other attendees, each attendee can be designated as an anonymous attendee or a non-anonymous attendee. In some embodiments, each anonymous attendee is placed into a same group designated as "other attendees." Thus, any communications from an anonymous attendee will be designated as being from the entire group—"other attendees." In some other embodiments, anonymous attendees can be place into different groups. For example, a first group of anonymous attendees can be placed into anonymous group X, and a second group of anonymous attendees can be placed into anonymous group Y. Thus, communications from any anonymous attendee in the first group will be designated as being from anonymous group X, and communications from any anonymous attendee in the second group will be designated as being from anonymous group X.

In some embodiments, a communication from any anonymous attendee is anonymous to all other attendees. In other words, for a communication, identification of the anonymous attendee is not provided any other attendee. In some other embodiments, a communication from an anonymous attendee is anonymous to attendees not in the same group. For example, assume, the instant message group conversation includes two anonymous groups—anonymous group X and anonymous group Y. If an anonymous attendee from anonymous group X transmits a response, the other attendees in the anonymous group X can view the identification of the anonymous attendee as part of the response. However, attendees not in anonymous group X cannot view the identification of the anonymous attendee as part of the response.

In some other embodiments, a communication from an anonymous attendee is anonymous to attendees not in the same group and one or more other anonymous groups. For example, assume, the instant message group conversation includes four anonymous groups—anonymous group X, anonymous group Y, anonymous group Z, and anonymous group T. If an anonymous attendee from anonymous group X transmits a response, the other attendees in the anonymous group X and anonymous group Y can view the identification of the anonymous attendee as part of the response. However, attendees not in any anonymous group and attendees in anonymous groups C and D cannot view the identification of the anonymous attendee as part of the response.

In some embodiments, an attendee can be identified as an anonymous attendee or non-anonymous attendee based on their relationship to other attendees. For example, if an attendee is a manager or boss of the other attendees or vice versa, the attendee could be identified as an anonymous attendee. In another example, if an attendee is working at a competing business, the attendee could be placed into a particular anonymous group.

In some embodiments, an attendee can be identified as an anonymous attendee or non-anonymous attendee based on a domain name for the account of the attendee. For example, if a domain name for the account of the attendee is "businessA.com", the attendee is identified as an anonymous attendee. However, if a domain name for the account of the attendee is "businessB.com", the attendee cannot be placed into an anonymous group.

Figure 3:
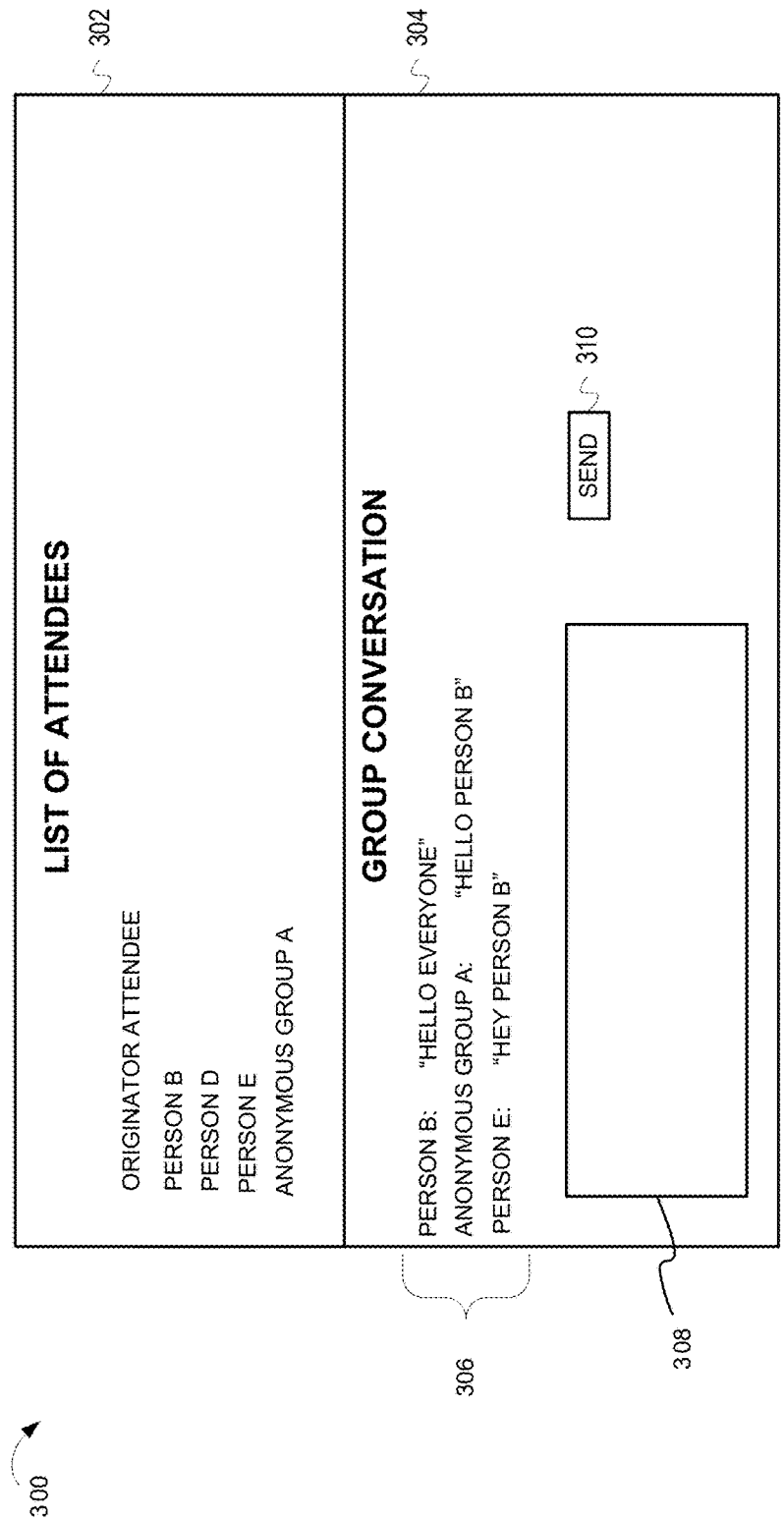
FIG. 3 depicts an example interface that includes a conversation history and interface for inputting a message to be included in an instant message group conversation, according to some embodiments.

In addition to selection of attendees and whether they are anonymous or not, the instant message application can also provide an interface for inputting a message that is to be as part of the instant message group conversation. An example interface for inputting a message that is to be as part of the instant message group conversation is depicted in FIG. 3, which is further described below.

After selecting the attendees and their identification as anonymous or not, the communication device 124 transmits the initial communication for the instant message group conversation to the other attendees (see communication B). The communication device 124 transmits communication B through the network 102 to the communication devices of each of the other attendees—the communication device 126 associated with the anonymous attendee 106, the communication device 128 associated with the anonymous attendee 108, the communication device 130 associated with the anonymous attendee 110, and the communication device 132 associated with the anonymous attendee 112. The communication to the anonymous attendees can include a notification that their responses during the instant message group conversation will be anonymous. The notification can include whether the response will be anonymous to all other attendees, attendees not in the anonymous group, etc.

In this example, in response to receiving communication B, the communication device 126 associated with the anonymous attendee 106 transmits an anonymous response (communication C) back to each of the other attendees. As described above, the response from the anonymous attendee can be anonymous to all other attendees, attendees not in a particular group or groups, etc. The specific anonymous attendee 106 is not identified as the author to those attendees for whom the response is to be anonymous. Instead, the author of the response can be the anonymous group to which the anonymous attendee is associated (e.g., other attendees).

Also in this example, in response to receiving communication B or communication C, the communication device 130 associated with the non-anonymous attendee 110 transmits a non-anonymous response (communication D) back to the communication devices of each of the other attendees. The non-anonymous attendee 110 is identified as the author of the response and is included with the response sent to each of the other attendees.

Communications among the attendees of the instant message group conversation can continue until attendees cease responding to each other. While described as having the originator attendee determining who the attendees are and whether they are anonymous or not, in some embodiments, another attendee can add other attendees (anonymous or not) at any point of the instant message group communication.

In some embodiments, a user can be added as an attendee to the instant message group conversation in response to one or more other attendees being added. For example, if a specific combination of attendees is added as an anonymous group, a different attendee can be added to the same anonymous group. For example, if two or more engineers within a design team of engineers are added to an anonymous group or non-anonymously to the conversation, the senior engineer or architect for the design team is also added in the same capacity (in the same anonymous group or as an anonymous attendee).

In some embodiments, a user to receive the message can be placed in a group (anonymous or non-anonymous) based on the content of the message. For example, if the originator attendee creates an initial message with specific content (e.g., keywords), a user assigned to be an attendee will be assigned to an anonymous group. Instead of being assigned to an anonymous group, a user can be invited as an impersonator of another attendee. If an anonymous attendee shares a file as part of the instant message group conversation, the file can be scanned to remove any potential identifiers for the anonymous attendee prior to the file being transmitted in the message. For example, certain metadata can be removed from the file to preclude other attendees from being able to identify the anonymous attendee that is transmitting the file.

Also, some embodiments include a toggle switch to allow an attendee to switch between being anonymous and non-anonymous. For example, a non-anonymous attendee can toggle to being anonymous when a particular message is transmitted as part of the instant message group conversation.

FIG. 2 depicts an example interface to allow an originator attendee to select other attendees to be part of an instant message group conversation, according to some embodiments. The interface includes a list 200 of persons that are potential attendees that the originator attendee can select to be part of the instant message group conversation. For example, the interface can be presented on the communication device that the originator attendee is using for the instant message group conversation. The list of potential attendees includes a person A 202, a person B 204, a person C 206, a person D 208, a person E 210, a person F 212, and a person G 214.

After selection of the person, the interface provides a selection of whether the person will be anonymous or non-anonymous. In this example, a person can be invited as a non-anonymous attendee (see invite 220). Alternatively, a person can be invited as an anonymous attendee. As shown, the interface allows the person to be placed into one or more of multiple anonymous groups. In this example, a person selected as an attendee can be place into an anonymous group X (see invite 222), an anonymous group N (see invite 224), etc. For this example, the originator attendee invites persons B, D, and E as non-anonymous attendees using the invite 220 and invites persons A and C as anonymous attendees and placed in anonymous group X using invite 222. Persons F and G are not invited.

In this example, the originator attendee determines who the attendees are, whether they are anonymous or not, and any selection of anonymous groups. However, as described above, in some embodiments, determination of whether an attendee is anonymous or not and any selection of anonymous groups can be based on various criteria (e.g., a relationship of the attendee to other attendees, domain name for the account of the attendee, etc.).

FIG. 3 depicts an example interface that includes a conversation history and interface for inputting a message to be included in an instant message group conversation, according to some embodiments. In particular, FIG. 3 depicts an interface 300 that includes a list of attendees 302 and a group conversation section 304. The example depicted in FIG. 3 continues with the example from FIG. 2. The list of attendees 302 for this example instant message group conversation includes the originator attendee that initially created the conversation. The list of attendees 302 includes the persons B, D, and E as non-anonymous attendees selected by the originator attendee (as described above). The list of attendees 302 includes the anonymous group X. Thus, any communication by an anonymous attendee in the anonymous group X is attributed to the anonymous group X and not to any specific anonymous attendee.

The group conversation section 304 includes a conversation history 306, an input dialog box 308, and an input button 310. The conversation history 306 provides a list of at least a portion of the previous communications among the attendees for the current instant message group conversation. In this example, the conversation history 306 includes 3 prior communications—two non-anonymous communications from persons B and E and one anonymous communication which is labeled as being from the anonymous group X. The input dialog box 308 receives user input (e.g., text) to be included in the instant message group conversation. Selection of the send button 310 by the attendee causes the user input to be transmitted to the other attendees in the instant message group conversation.

Example Operations

Figure 4:
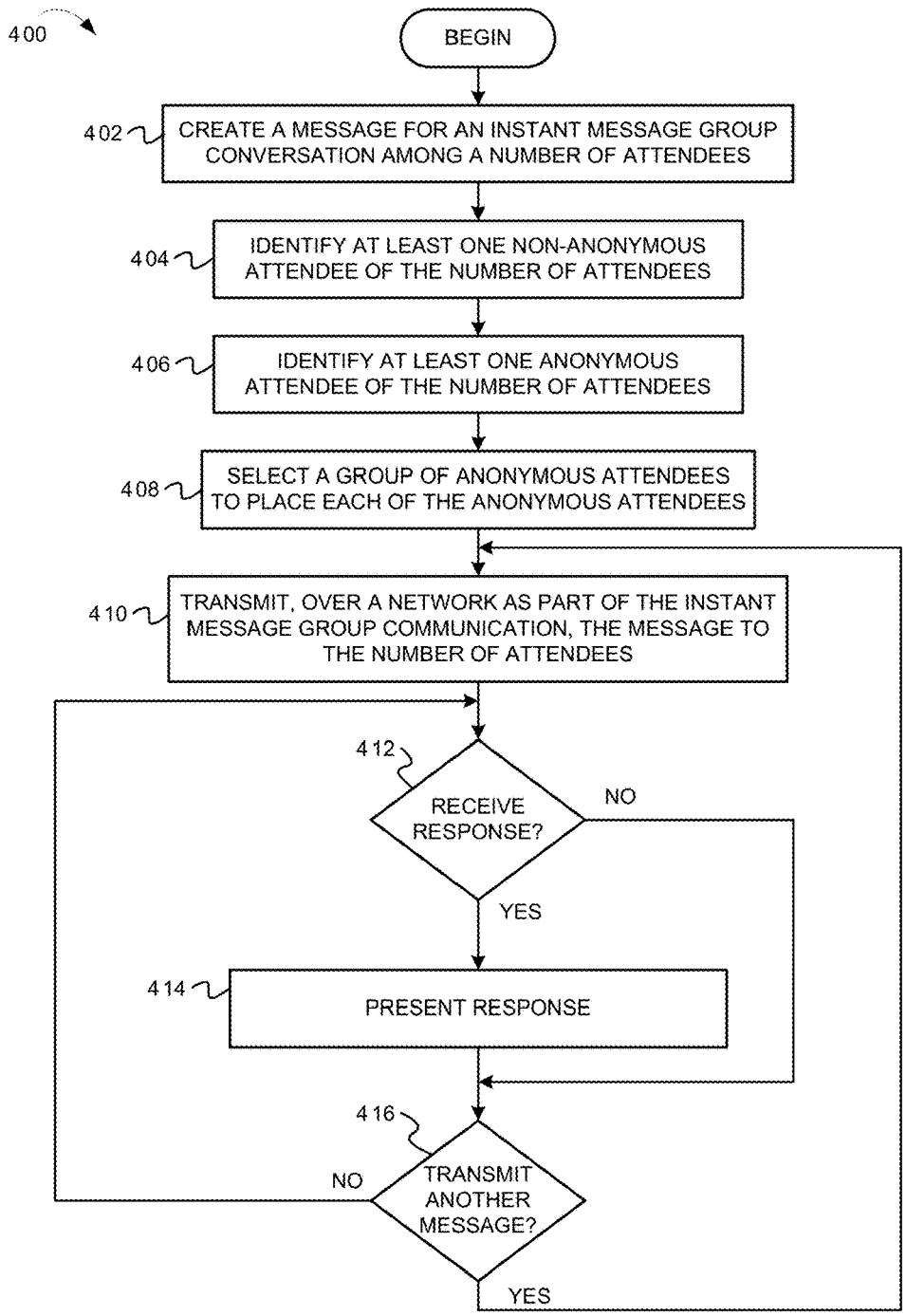
FIG. 4 depicts a flowchart of operations from a perspective of a device of an attendee that originated an instant message group conversation, according to some embodiments.

FIG. 4 depicts a flowchart of operations from a perspective of a device of an attendee that originated an instant message group conversation, according to some embodiments. A flowchart 400 of FIG. 4 is described with reference to FIG. 1. Operations of the flowchart 400 can be performed by software, firmware, hardware or a combination thereof. For example, operations can be performed by communication devices depicted in FIG. 1. The operations of the flowchart 400 start at block 402.

An instant message group conversation among a number of attendees is created (402). With reference to FIG. 1, the communication device 124 associated with the originator attendee 104 creates an instant message group conversation. For example, the originator attendee 104 can provide input to create the instant message group conversation. The originator attendee 104 can open an instant message application on the communication device 124. The instant message application can provide an interface for selecting the other attendees. The initial message can include text, video, audio, etc.

At least one non-anonymous attendee is identified to be part of the instant message group conversation (404). As part of creating the instant message group conversation, the originator attendee can provide input to select from the other attendees that are to be part of the instant message group conversation along with the initial message. As part of the selection of the other attendees, each attendee can be designated as an anonymous attendee or a non-anonymous attendee. Thus, the instant message group conversation can include one to any number of non-anonymous attendees. Communication devices of non-anonymous attendees can be associated with an Internet Protocol (IP) address or Media Access Control (MAC) address. Transmission of messages to the non-anonymous attendees can be based on the IP address or MAC address of their associated communication devices.

As described above, in addition to being based on input from the originator attendee, identification of a non-anonymous attendee can also be based on other criteria. In some embodiments, an attendee can be identified as a non-anonymous attendee based on their relationship to other attendees. For example, if an attendee is an engineer who is having their design or product reviewed during the instant message group conversation, the attendee would be non-anonymous, while the other attendees who are fellow engineers who are reviewing the design or product would be anonymous to allow them to provide honest evaluation of the design or product. In some embodiments, an attendee can be identified as a non-anonymous attendee based on a domain name for the account of the attendee. For example, if a domain name for the account of the attendee is "businessA.com", the attendee is identified as an anonymous attendee. However, if a domain name for the account of the attendee is "businessB.com", the attendee is required to be a non-anonymous attendee.

At least one anonymous attendee is identified to be part of the instant message group conversation (406). The originator attendee can provide input to select which attendees who are to participate in the instant message group conversation will be anonymous attendees. The instant message group conversation can include one to any number of anonymous attendees. Similar to selection of non-anonymous attendees, in addition to being based on input from the originator attendee, identification of an anonymous attendee can also be based on other criteria. In some embodiments, an attendee can be identified as an anonymous attendee based on their relationship to other attendees. In some embodiments, an attendee can be identified as an anonymous attendee based on a domain name for the account of the attendee. Communication devices of anonymous attendees can be associated with an IP address or MAC address. Transmission of messages to the anonymous attendees can be based on the IP address or MAC address of their associated communication devices.

An anonymous group is selected for each of the anonymous attendees (408). The originator attendee can select an anonymous group for each of the anonymous attendees. In some embodiments, each anonymous attendee is placed into a same group designated as "other attendees." Thus, any communications from an anonymous attendee will be designated as being from the entire group—"other attendees." In some other embodiments, anonymous attendees can be place into different groups. For example, a first group of anonymous attendees can be placed into anonymous group X, and a second group of anonymous attendees can be placed into anonymous group Y. Thus, communications from any anonymous attendee in the first group will be designated as being from anonymous group X, and communications from any anonymous attendee in the second group will be designated as being from anonymous group X.

As described above, anonymity for an anonymous attendee can vary. For example, a communication from any anonymous attendee can be anonymous to all other attendees. In some other embodiments, a communication from an anonymous attendee is anonymous to attendees not in the same group. For example, assume, the instant message group conversation includes two anonymous groups—anonymous group X and anonymous group Y. If an anonymous attendee from anonymous group X transmits a response, the other attendees in the anonymous group X can view the identification of the anonymous attendee as part of the response. However, attendees not in anonymous group X cannot view the identification of the anonymous attendee as part of the response. In some other embodiments, a communication from an anonymous attendee is anonymous to attendees not in the same group and one or more other anonymous groups.

The message is then transmitted over a network to the number of attendees (410). With reference to FIG. 1, the communication device 124 transmits communication B through the network 102 to the communication devices of each of the other attendees—the communication device 126 associated with the anonymous attendee 106, the communication device 128 associated with the anonymous attendee 108, the communication device 130 associated with the anonymous attendee 110, and the communication device 132 associated with the anonymous attendee 112.

A determination is made of whether a response (anonymous or non-anonymous is received (412). With reference to FIG. 1, the communication device 124 determines whether any responses are received from the communications devices associated with any of the anonymous attendees 106-108 or any of the non-anonymous attendees 110-112. If a response is received from an anonymous attendee, the response from the anonymous attendee can be anonymous to all other attendees, attendees not in a particular group or groups, etc. If the response is anonymous to the receiving attendee, identification of the author of the response can be the anonymous group to which the anonymous attendee had been assigned (e.g., "other attendees", anonymous group X, anonymous group Y, etc.). If there is a response, operations continue at block 414. If there is no response, operations continue at block 416.

The response is presented at the communication device (414). With reference to FIG. 1, the communication device 124 presents the response on one of its displays, outputs any audio from its speakers, etc. In particular, the response can be text, video, audio, etc.

A determination is made of whether to transmit another message (416). With reference to FIG. 1, the communication device 124 can determine whether the originator attendee 104 inputs another message (e.g., text) to send as part of the instant message group conversation. If there is another message to transmit, operations return to block 410. If there is currently not another message to transmit, operations return at block 412 to check if a response is received from another one of the attendees. Operations of the flowchart 400 can continue until attendees cease responding to each other or the originator attendee 104 terminates the instant message group conversation.

Figure 5:
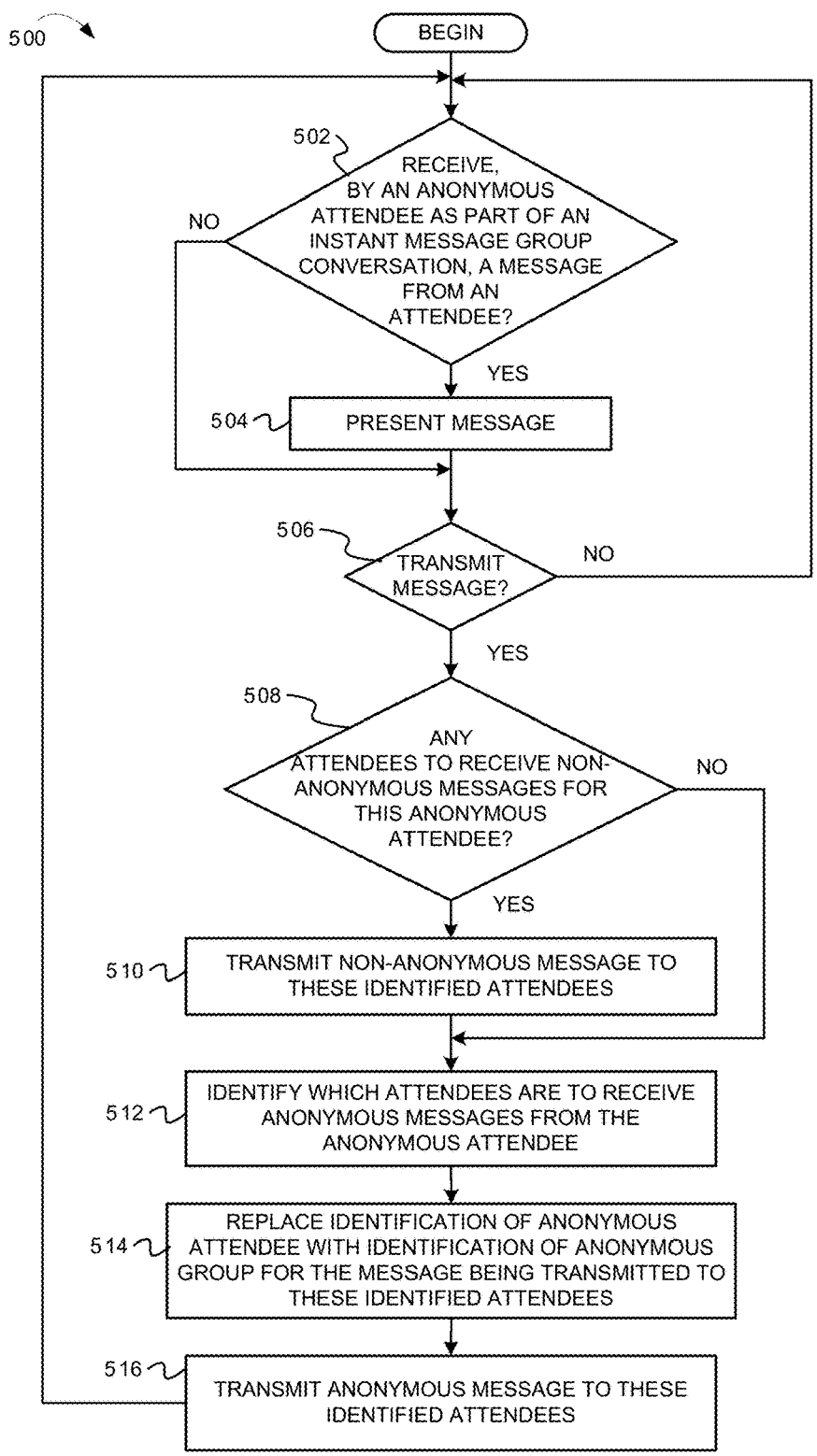
FIG. 5 depicts a flowchart of operations from a perspective of a device of an anonymous attendee of an instant message group conversation, according to some embodiments.

FIG. 5 depicts a flowchart of operations from a perspective of a device of an anonymous attendee of an instant message group conversation, according to some embodiments. A flowchart 500 of FIG. 5 is described with reference to FIG. 1. Operations of the flowchart 500 can be performed by software, firmware, hardware or a combination thereof. For example, operations can be performed by communication devices depicted in FIG. 1. The operations of the flowchart 500 start at block 502.

A determination is made of whether a message that is part of an instant message group conversation is received by a communication device associated with an anonymous attendee (502). With reference to FIG. 1 for example, the communication device 126 associated with the anonymous attendee 106 can receive the initial message (communication B) to initiate the instant message group conversation from the communication device 124 associated with the originator attendee 104. The initial communication from the originator attendee can include a notification that the anonymous attendee's responses during the instant message group conversation will be anonymous. The notification can include whether the response will be anonymous to all other attendees, attendees not in the anonymous group, etc. In another example, the communication device 126 associated with the anonymous attendee 106 can receive a response from another one of the attendees after the initial message. For example, the communication device 130 associated with the non-anonymous attendee 110 can transmit a non-anonymous response (communication D) to the communication devices of each of the other attendees. The non-anonymous attendee 110 is identified as the author of the response and is included with the response sent to each of the other attendees. If a message is received, operations of the flowchart 500 continue at block 504. If a message is not received, operations of the flowchart 500 continue at block 506.

The message is presented at the communication device (504). With reference to FIG. 1, the communication device 126 presents the message on one of its displays, outputs any audio from its speakers, etc.

A determination is made of whether to transmit a message (506). With reference to FIG. 1, the communication device 126 can determine whether the anonymous attendee 106 inputs a message (e.g., text) to send as part of the instant message group conversation. If the initial message from the originator attendee has not yet been received to initiate the instant message group conversation, the determination would be to not transmit a message. Otherwise, the anonymous attendee can transmit a message at any point after the initial message for the instant message group conversation is received. If there is a message to transmit, operations continue to block 508. If there is currently not a message to transmit, operations return at block 502 to check if a message is received from another one of the attendees.

A determination is made of whether any attendees are to receive non-anonymous messages from this anonymous attendee (508). As described above, in some embodiments, a communication from an anonymous attendee is anonymous to all other attendees. In some other embodiments, a communication from an anonymous attendee is anonymous to attendees not in the same group. For example, assume, the instant message group conversation includes two anonymous groups—anonymous group X and anonymous group Y. If an anonymous attendee from anonymous group X transmits a response, the other attendees in the anonymous group X can view the identification of the anonymous attendee as part of the response. However, attendees not in anonymous group X cannot view the identification of the anonymous attendee as part of the response. In some other embodiments, a communication from an anonymous attendee is anonymous to attendees not in the same group and one or more other anonymous groups. For example, assume, the instant message group conversation includes four anonymous groups—anonymous group X, anonymous group Y, anonymous group Z, and anonymous group T. If an anonymous attendee from anonymous group X transmits a response, the other attendees in the anonymous group X and anonymous group Y can view the identification of the anonymous attendee as part of the response. However, attendees not in any anonymous group and attendees in anonymous groups C and D cannot view the identification of the anonymous attendee as part of the response. If there are any attendees that are to receive non-anonymous messages from this anonymous attendee, operations of the flowchart 500 continue at block 510. If there are not any attendees that are to receive non-anonymous messages from this anonymous attendee, operations of the flowchart 500 continue at block 512.

A non-anonymous message is transmitted to these identified attendees that are receive non-anonymous messages from this anonymous attendee (510). With reference to FIG. 1, the communication device 126 can transmit a non-anonymous message with the anonymous attendee 106 identified as the author of the message to those attendees that are to receive non-anonymous messages from the anonymous attendee 106. For example, these attendees could be in the same anonymous group as the anonymous attendee 106. As described above, communication devices of attendees can be associated with an IP address or MAC address. Therefore, transmission of these messages can be based on the IP address or MAC address of communication devices associated with the attendees that are to receive the non-anonymous messages.

Attendees that are to receive anonymous messages from the anonymous attendee are identified (512). With reference to FIG. 1, the communication device 126 can transmit an anonymous message to those attendees that are to receive anonymous messages from the anonymous attendee 106. For example, those attendees not in the same anonymous group as the anonymous attendee 106 are to receive anonymous messages from the anonymous attendee 106. In another example, all attendees are to receive anonymous messages from the anonymous attendee 106.

Identification of the anonymous attendee is replaced with identification of the anonymous group of which the anonymous attendee is within for messages being transmitted to the attendees identified at 512 (514). With reference to FIG. 1, the communication device 126 can replace identification of the anonymous attendee 106 with identification of the anonymous group to which the anonymous attendee 106 is within. If there is only one anonymous group, identification of the anonymous group can be "other attendees."

Anonymous messages are transmitted to these attendees identified at 512 (516). With reference to FIG. 1, the communication device 126 can the anonymous messages to the communication devices associated with these attendees identified at 512. As described above, this could include some or all of the attendees that are part of the instant message group conversation. As described above, communication devices of attendees can be associated with an IP address or MAC address. Therefore, transmission of these messages can be based on the IP address or MAC address of communication devices associated with the attendees that are to receive the anonymous messages. Operations continue at 502, where a determination is again made of whether a message is received from another attendee. Operations of the flowchart 500 can continue until attendees cease responding to each other.

Various operations depicted in FIGS. 4-5 are described as being performed by a particular communication device. However, in some embodiments, these operations can be performed by other communication devices, a remote server communicatively coupled to the communication devices, etc. For example, replacing identification of the anonymous attendees at 514 can be performed by the communication device receiving the message or performed by some remote administrative server communicatively coupled to the communication devices.

Example Computer Device

Figure 6:
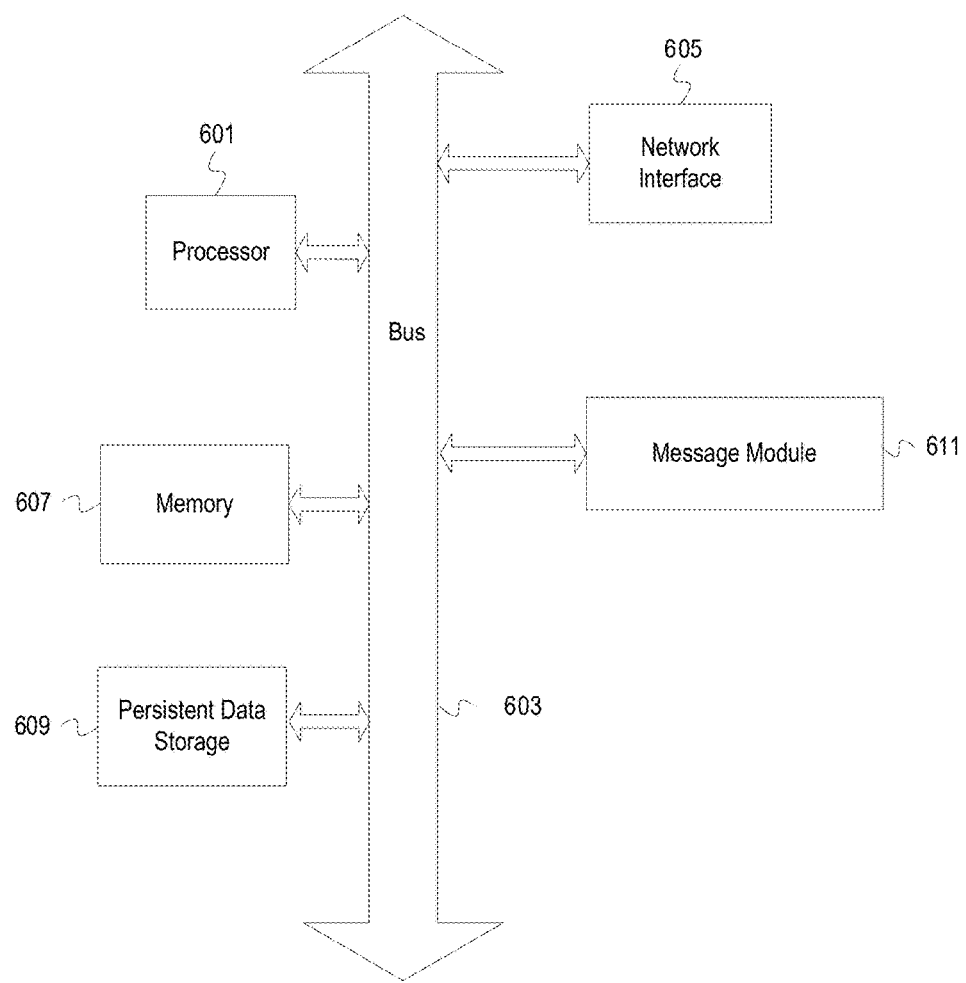
FIG. 6 depicts an example computer device, according to some embodiments.

FIG. 6 depicts an example computer device, according to some embodiments. The example computer device can represent any one of the communications devices depicted in FIG. 1. The computer device includes a processor 601 (possibly including multiple processors, multiple cores, multiple nodes, and/or implementing multi-threading, etc.). The computer device includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device also includes a persistent data storage 609. The persistent data storage 609 can be a hard disk drive, such as magnetic storage device.

The computer device also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.).

The computer device also includes a message module 611. The message module 611 can perform the instant message operations, as described above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601, the network interface 605, and the persistent data storage 609 are coupled to the bus 603. Although illustrated as being coupled to the bus 603, the memory 607 may be coupled to the processor 601.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for anonymous messaging for instant message group conversations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
creating, by a first device associated with a first attendee, an instant message group conversation including,
  creating a message for an instant message group conversation among a plurality of attendees that includes the first attendee; and
  receiving selections for each of a plurality of attendees to be included in the instant message group conversation, wherein the received selections designate each of the plurality of attendees as an anonymous attendee or a non-anonymous attendee, and wherein each of the received selections of anonymous attendees specifies one of a plurality of group identifiers (IDs) each corresponding to one of a plurality of anonymous groups;
transmitting, by the first device, the message to devices associated with the plurality of attendees;
receiving, by the first device as part of the instant message group conversation, a first response to the message from a second device associated with a first anonymous attendee of the designated anonymous attendees, wherein the first response specifies a group ID as a sender identifier of the first anonymous attendee; and
receiving, by the first device as part of the instant message group conversation, a second response to the message from a third device associated with a first non-anonymous attendee of the designated non-anonymous attendees, wherein the second response specifies, as a sender identifier of the first non-anonymous attendee, a user identifier for an attendee associated with the third device.

2. The method of claim 1, wherein transmitting the message comprises transmitting a notification to the first anonymous attendee that any responses provided by the first anonymous attendee to the instant message group conversation are anonymous.

3. The method of claim 1, further comprising identifying the first anonymous attendee based, at least in part, on a relationship between the first anonymous attendee and others of the plurality of attendees.

4. A first device associated with a first attendee comprising:
   a processor; and
   a machine-readable medium having program code executable to cause the first device to:
      create an instant message group conversation by,
         creating a message for an instant message group conversation among a plurality of attendees that includes a first attendee; and
         receiving selections for each of a plurality of attendees to be included in the instant message group conversation, wherein the received selections designate each of the plurality of attendees as an anonymous attendee or a non-anonymous attendee, and wherein each of the received selections of anonymous attendees specifies one of a plurality of group identifiers (IDs) each corresponding to one of a plurality of anonymous groups;
      transmit the message to devices associated with the plurality of attendees;
      receive, as part of the instant message group conversation, a first response to the message from a second device associated with a first anonymous attendee of the designated anonymous attendees, wherein the first response specifies a group ID as a sender identifier of the first anonymous attendee; and
      receive, as part of the instant message group conversation, a second response to the message from a third device associated with a first non-anonymous attendee of the designated non-anonymous attendees, wherein the second response specifies, as a sender identifier of the first non-anonymous attendee, a user identifier for an attendee associated with the third device.

5. The first device of claim 4, wherein the program code executable to cause the first device to transmit the message comprises program code executable to cause the first device to transmit a notification to the first anonymous attendee that any responses provided by the first anonymous attendee to the instant message group conversation are anonymous.

6. The first device of claim 4, wherein the program code further includes program executable to cause the first device to identify the first anonymous attendee is based, at least in part, on a relationship between the first anonymous attendee and others of the plurality of attendees.

7. One or more machine-readable storage media having program code stored therein, the program code comprising instructions to:
   create, by a first device associated with a first attendee, an instant message group conversation including,
      creating a message for an instant message group conversation among a plurality of attendees that includes the first attendee; and
      receiving selections for each of a plurality of attendees to be included in the instant message group conversation, wherein the received selections designate each of the plurality of attendees as an anonymous attendee or a non-anonymous attendee, and wherein each of the received selections of anonymous attendees specifies one of a plurality of group identifiers (IDs) each corresponding to one of a plurality of anonymous groups;
   transmit, by the first device, the message to devices associated with the plurality of attendees;
   receive, by the first device as part of the instant message group conversation, a first response to the message from a second device associated with a first anonymous attendee of the designated anonymous attendees, wherein the first response specifies a group ID as a sender identifier of the first anonymous attendee; and
   receive, by the first device as part of the instant message group conversation, a second response to the message from a third device associated with a first non-anonymous attendee of the designated non-anonymous attendees, wherein the second response specifies, as a sender identifier of the first non-anonymous attendee, a user identifier for an attendee associated with the third device.

* * * * *